US005193148A

United States Patent [19]

Alcorn et al.

[11] Patent Number: 5,193,148

[45] Date of Patent: Mar. 9, 1993

[54] METHOD AND APPARATUS FOR PIXEL CLIPPING SOURCE AND DESTINATION WINDOWS IN A GRAPHICS SYSTEM

[75] Inventors: Byron A. Alcorn, Fort Collins; Robert W. Cherry, Loveland; Mark D. Coleman; Brian D. Rauchfuss, both of Fort Collins, all of Colo.

[73] Assignee: Hewlett Packard Company, Palo Alto, Calif.

[21] Appl. No.: 803,742

[22] Filed: Dec. 4, 1991

Related U.S. Application Data

[63] Continuation of Ser. No. 494,992, Mar. 16, 1990, abandoned.

[51] Int. Cl.$^5$ .................................... G06F 15/66

[52] U.S. Cl. .................................... 395/157; 395/155; 340/747; 340/724

[58] Field of Search .................... 395/157, 158, 155; 340/747, 750, 724, 798, 799

[56] References Cited

U.S. PATENT DOCUMENTS

| | | | |
|---|---|---|---|
| 4,414,628 | 11/1983 | Ahuja et al. | 364/200 |
| 4,642,790 | 2/1987 | Minshull et al. | 364/900 |
| 4,769,636 | 9/1988 | Iwami et al. | 340/724 |
| 4,941,107 | 7/1990 | Hasebe | 364/518 |
| 4,958,302 | 9/1990 | Fredrickson et al. | 364/521 |
| 4,961,153 | 10/1990 | Fredrickson et al. | 364/521 |
| 5,001,469 | 3/1991 | Pappas et al. | 340/721 |

*Primary Examiner*—Gary V. Harkcom
*Assistant Examiner*—Phu K. Nguyen
*Attorney, Agent, or Firm*—Guy J. Kelley

[57] ABSTRACT

A method of moving blocks of pixel data, including window-identifying data, from a source area to a destination area within a frame buffer in a computer graphics system comprises the steps of: reading a block of pixel data from the source area into a pixel cache memory; combining source tiles with destination tiles in the cache; comparing pixel window identifiers read from the frame buffer with a pixel window identifier previously stored in the memory to determine whether the pixel window identifiers read from the frame buffer match the previously stored pixel window identifier; discarding each pixel whose corresponding window identifier does not match the previously stored window identifier; and updating the frame buffer with the pixel data not discarded.

28 Claims, 2 Drawing Sheets

METHOD AND APPARATUS FOR PIXEL CLIPPING SOURCE AND DESTINATION WINDOWS IN A GRAPHICS SYSTEM

This is a continuation of copending application Ser. No., 07/494,992 filed on Mar. 16, 1990, now abandoned.

CROSS REFERENCE TO RELATED APPLICATION(S)

1. Field of the Invention

This invention relates to computer workstation window systems. More specifically, this invention relates to methods and apparatus for moving pixel value data to and from source and destination windows on frame buffers in computer frame buffer workstations.

BACKGROUND OF THE INVENTION

Computer workstations provide system users with powerful tools to support a number of functions. An example of one of the more useful functions which workstations provide is the ability to perform highly detailed graphics simulations for a variety of applications. Graphics simulations are particularly useful for engineers and designers performing computer aided design (CAD) and computer aided manufacturing (CAM) tasks.

Modern workstations having graphics capabilities utilize "window" systems to accomplish graphics manipulations. An emerging standard for graphics window systems is the "X" window system developed at the Massachusetts Institute of Technology. The X window system is described in K. Akeley and T. Jermoluk, "High-Performance Polygon Rendering", *Computer Graphics*, 239–246, (August 1988). Modern window systems in graphics workstations must provide high-performance, multiple windows yet maintain a high degree of user interactivity with the workstation. Previously, software solutions for providing increased user interactivity with the window system have been implemented in, graphics workstations. However, software solutions which increase user interactivity with the system tend to increase processor work time, thereby increasing the time in which graphics renderings to the screen in the workstation may be accomplished.

A primary function of window systems in graphics workstations is to provide the user with simultaneous access to multiple processes on the workstation. However, each of these processes provides an interface to the user through its own area onto the workstation display. The overall result is an increase in user productivity since the user can manage more than one task at a time with multiple windows. However, each process associated with a window views the workstation resources as if it were the sole owner. Thus, resources such as the processing unit, memory, peripherals and graphics hardware must be shared between these processes in a manner which prevents interprocess conflicts on the workstation.

Typical graphics systems utilize a graphics pipeline which interconnects a "host" processor to the various hardware components of the graphics system and which provides the various graphics commands available to the system. The host processor is interfaced through the graphics pipeline to a "transform engine" which generally comprises a number of parallel floating point processors. The transform engine performs a multitude of system tasks including context management, matrix transformation calculations, light modeling and radiosity computations, and control of vector and polygon rendering hardware.

In graphics systems, some scheme must be implemented to "render" or draw graphics primitives to the system screen. A "graphics primitive" is a basic component of a graphics picture such as, for example, a polygon or vector. All graphics pictures are formed from combinations of these graphics primitives. Many schemes may be utilized to perform graphics primitives rendering. Regardless of the type of graphics rendering scheme utilized by the graphics workstation, the transform engine is essential in managing graphics rendering.

A graphics "frame buffer" is interfaced further down the pipeline from the host processor and transform engine in the graphics window system. A "frame buffer" generally comprises a plurality of video random access memory (VRAM) computer chips which store information concerning pixel activation on the display corresponding to the particular graphics primitives which will be rendered to the screen. Generally, the frame buffer contains all of the data graphics information which will be written onto the windows, and stores this information until the graphics system is prepared to display this information on the workstation's screen. The frame buffer is generally dynamic and is periodically refreshed until the information stored on it is output to the screen.

Computer graphics workstations convert image representations stored in the computer's memory to image representations which are easily understood by humans. The image representations are typically displayed on cathode ray tube (CRT) devices divided into arrays of pixel elements which can be stimulated to emit a range of colored light. The particular color of light that a pixel emits is called its "value". Display devices such as CRTs typically stimulate pixels sequentially in some regular order, such as left to right and top to bottom, and repeat the sequence 50 to 70 times a second to keep the screen refreshed.

Frame buffers in modern graphics workstations may divide pixel value data into a plurality of horizontal strips, with each strip being further subdivided into a plurality of tiles. See, e.g. U.S. Pat. No. 4,780,709, Randall. Each tile represents a portion of the window to be displayed on the screen, and each tile is further defined by tile descriptors which include memory address locations of data to be displayed in that particular tile. Thus, the tiles generally contain a plurality of pixels, although a tile can be as small as one pixel in width. Each viewing window on the frame buffer may be arbitrarily shaped by combinations of different tiles which may be rectangularly shaped.

Typical graphics window systems are adapted to support block move operations of pixel value data on a frame buffer in order to maximize system performance. These block move operations are usually designed to support basic window primitives including raster texts and icons. Various types of graphics block moves are accomplished on existing frame buffers such as shuffles, and block resizes.

A block of pixel value data may be considered as an entire window, or merely part of a window comprising a set of graphics primitives on the graphics system. Block moves are particularly difficult to handle in a graphics window environment because window offset addresses need to be included in these operations which are typically implemented as screen address relative. In contrast, block move operations inside a window must be window relative so that forcing all block moves within a graphics system to be window relative is neither an adequate nor versatile solution.

Heretofore, block move operations inside a window have not necessarily been window relative, but have always been performed according to frame buffer relative addresses where a window may be located any place within the frame buffer address space. However, many graphics objects or primitives, such as for example fonts, are stored in off-screen memory on the frame buffer and thus these objects are identified exclusively according to frame buffer relative addresses. Furthermore, moving blocks of pixel data between source and destination addresses in prior frame buffer systems is usually accomplished in software through the graphics pipeline which requires the system to make decisions about the particular rendering coordinate system of the window simultaneously as the window traverses the pipeline. Thus, additional processor overhead time is incurred while manipulating graphics primitives according to frame buffer relative addresses which necessarily occurs in parallel with the processing of the graphics application in the pipeline. This is a highly undesirable utilization of a graphics pipeline computer system.

There is a long-felt need in the art for graphics window systems which move blocks of pixel value data between source windows and destination windows within a frame buffer in an efficient manner while minimizing system processor time. Furthermore, there is a need in the art for pixel data block move operations which can be accomplished independently of graphics software commands from a host processor. These needs have not heretofore been solved by prior graphics frame buffer systems.

SUMMARY OF THE INVENTION

Methods and apparatus for pixel clipping source and destination windows in graphics frame buffer systems solve the aforementioned needs in the art. Methods and apparatus provided in accordance with the present invention allow window clipping to be performed in hardware rather than software, thereby greatly reducing processor time to accomplish the source and destination pixel block moves on a frame buffer and increasing the overall efficiency of the graphics frame buffer system. Methods of moving blocks of pixel data within a frame buffer in a computer graphics frame buffer system comprise the steps of reading a source area from a frame buffer into a memory according to a plurality of source tiles, combining the source tiles with destination tiles in the memory, comparing pixel data identities in the frame buffer with pixel data identities in the memory to determine whether the pixel data identities in the frame buffer match the pixel data identities in the memory, discarding the pixels whose identities in the frame buffer do not match identities in the memory, and updating the frame buffer with the pixel data whose identities in the frame buffer match the pixel identities in the memory.

Systems provided in accordance with the present invention also solve the aforementioned long-felt needs. Systems for moving data blocks from a source window to a destination window in a graphics system comprise memory means for storing source window data and destination window data, source window register means interfaced with the memory means for storing pixel value data and data concerning a pixel's location within the source window, first comparator means interfaced with the source window register means for comparing the pixel value data with a source window identifier, destination window register means interfaced with the memory means for storing the pixel value data within the destination window, second comparator means interfaced with the destination window register means for comparing the pixel value data with a destination window identifier, and combining means interfaced with the first and second comparator means for determining whether source pixels can be moved to the destination window.

DETAILED DESCRIPTION OF PREFERRED EMBODIMENTS

Figure 1:
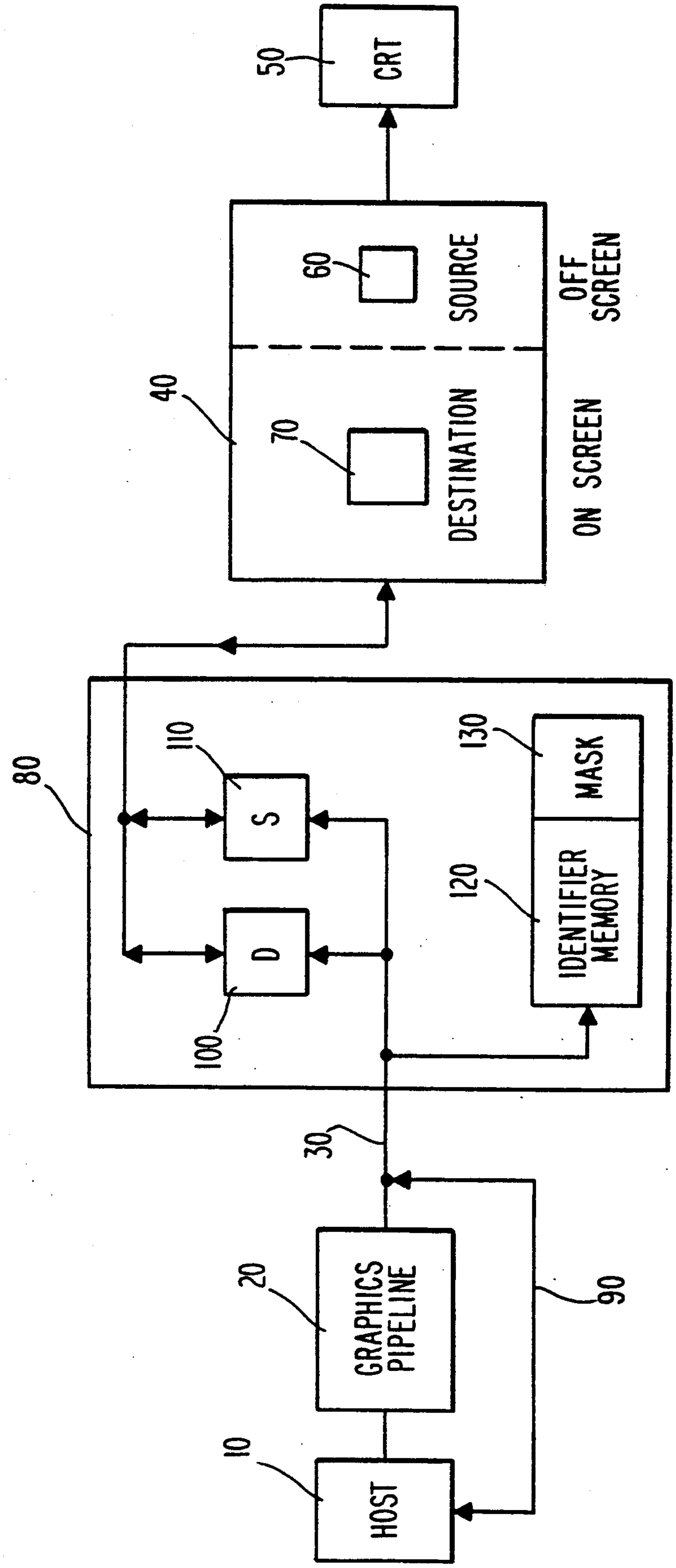
FIG. 1 is a block diagram of a graphics system having a frame buffer wherein blocks of pixel data are moved between a source window and a destination window within the frame buffer.

Referring now to the drawings wherein like reference numerals refer to like elements, FIG. 1 illustrates a graphics frame buffer system in accordance with the present invention wherein host processor 10 provides graphics commands and controls data movement through a graphics pipeline 20 which comprises various hardware elements in preferred embodiments. Data is bussed 30 through pipeline 20 to provide rendering of pixel primitives to frame buffer 40. In preferred embodiments, graphics pipeline 20 comprises a transform engine, a scan converter, and other hardware which responds to commands from host processor 10 so that pixel value data can be rendered to frame buffer 40.

There is a discrete data location for each pixel on frame buffer 40. Particular window information for each pixel is stored along with color data for the pixel at the discrete data location. This window information in preferred embodiments comprises an identification number that tells what window the pixel belongs in. In still further preferred embodiments, the frame buffer can be thought to be split in two regions. The first region is a portion of the frame buffer corresponding to a screen or monitor device where graphics primitives will be rendered. The second area is a portion of the frame buffer corresponding to an off-screen work area wherein most, but not necessarily all rendering is done according to screen relative coordinates. In the portion of the frame buffer corresponding to the screen, rendering may preferably be done in either window relative coordinates or screen relative coordinates for a pixel. The frame buffer is interfaced to a CRT monitor 50 which preferably is a typical raster scan display device comprising a plurality of pixels. CRT 50 is partitioned into pixel, or picture elements, which are addressed according to screen relative rows and addresses.

Block moves of data on CRT 50 involve moving one area of the frame buffer 40 from one location to another location within the frame buffer. When it is desired to move a block of data on screen 50, the data must first be moved on frame buffer 40, since the screen 50 is simply refreshed from the data values within frame buffer 40. Thus, frame buffer 40 can be thought of as having source areas of pixel data 60 which must be moved to destination areas 70 on frame buffer 40. While FIG. 1 shows the source area 60 in the portion of the frame buffer corresponding to the off-screen, screen relative work area, and a destination area 70 in the portion of the frame buffer corresponding to the screen, it will be recognized by those with skill in the art that in fact both the source and the destination areas could appear in the opposite areas, or both appear on the same areas in the frame buffer 40. It will be understood that a window could be any rectangular area on CRT screen 50. Furthermore, source area 60 and destination area 70 could be within the same window. Pixel block moves and pixel clipping contemplated in accordance with the present invention are able to handle all such situations.

A memory means 80 is interfaced with the frame buffer 40. In preferred embodiments, memory means 80 is also interfaced with host processor 10 through a graphics pipeline bypass bus 90 which allows direct access of memory means 80 to the host processor 10 without requiring data traverse through pipeline 20. This offers a significant advantage in data processing with workstations provided in accordance with the present invention, since a hardware solution to transfer of certain data directly from host processor 10 to memory means 80 is accomplished through graphics pipeline bypass bus 90, thereby freeing the graphics pipeline 20 from unnecessary overhead processor time in processing certain desired data transfers and commands. In still further preferred embodiments, memory means 80 is a pixel cache memory which stores pixel data which is read from frame buffer 40. Preferably, pixel cache 80 comprises a number of particular data registers. A destination register 100 is interfaced with frame buffer 40 so that the desired destination area data is stored in the destination register 100. Similarly, a source register 110 is interfaced with frame buffer 40 so that desired source area can be stored in the source register 110. Destination register 100 and source 110 are also interfaced to host processor 10 through graphics pipeline bypass 90 so that they can accept data transfers directly from host processor 10. Such data transfers are, for example, direct memory access (DMA) transfers from host processor 10 to frame buffer 40, and pixel writes to frame buffer 40 in full, byte, or bit modes.

In preferred embodiments, source register 110 is adapted to simultaneously read a plurality of tiles from source area 60 on frame buffer 40. In still further preferred embodiments, up to eight tiles are read sequentially from source area 60 to source register 110 and pixel cache 80. Destination register 100 is adapted to read a plurality of tiles from destination area 70 sequentially. Up to eight destination tiles can preferably be sequentially read from destination area 70 and stored in destination register 100 on pixel cache 80.

An identifier register 120 is also contained within pixel cache 80. In preferred embodiments, identifier register 120 is interfaced with host processor 10 through graphics pipeline bypass bus 90. Identifier register 120 is preferably adapted to store pixel window identity information bussed from host processor 10 for comparison with pixel window identity values on the frame buffer on the source area 60 and/or the destination area 70.

Mask register 130 is also interfaced to host processor 10 through graphics pipeline bypass bus 90, and to frame buffer 40. In preferred embodiments, mask register 130 is adapted to mask off a particular number of data bits to be used in comparing pixel identifier bits on the frame buffer with pixel identifier bits bussed from the host processor to identifier register 120 for the compare operation. In further preferred embodiments, the destination and source registers contained within pixel cache 80 are adapted to store eight planes of information per eight tiles. The identifier and mask registers are preferably eight bits deep.

In still further preferred embodiments, the four most significant bits of data in the destination register 100 and the source register 110 correspond to overlay planes for the pixel data blocks, the four least significant bits in these registers correspond to window clipping planes, and additionally four window display mode planes are placed in the off-screen part of the frame buffer for data block manipulation. In preferred embodiments, window planes on the frame buffer are 2048×1024 pixels, wherein the 768×1024×8 bits which are not displayed can be unfolded into 1536×1024×4, 1280×1024 ×4 display mode planes, and 256×4 off-screen overlay planes for frame buffers provided in accordance with the present invention.

Figure 2:
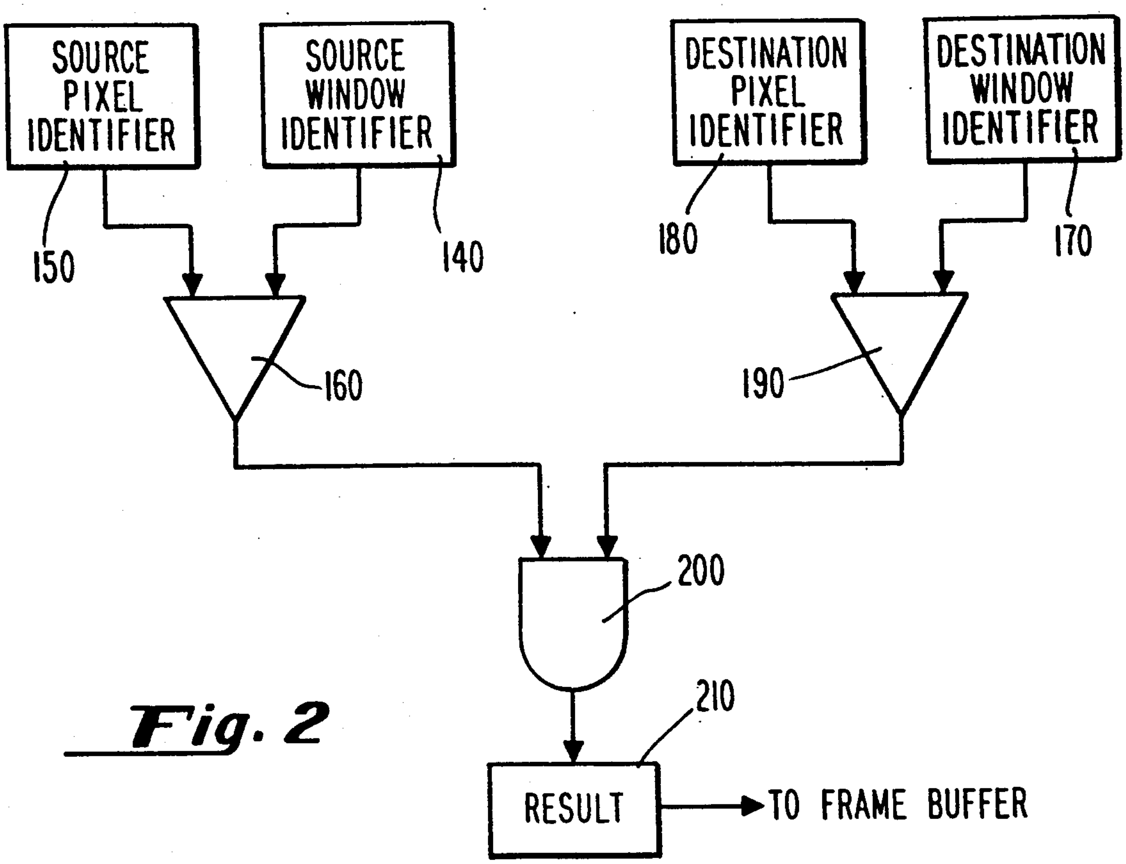
FIG. 2 is a block diagram of a circuit for providing source and destination window pixel clipping in accordance with the present invention.

In order to accomplish block moves and window pixel clipping in accordance with the present invention, the destination tiles are combined with source tiles one pixel at a time, and then written to the frame buffer. In preferred embodiments multiple tiles are read and cached in pixel cache 80. Referring to FIG. 2, a hardware implementation of window clipping provided in accordance with the present invention in pixel cache 80 is shown. A source window identifier 140 and source pixel identifier 150 which comprise source register 110 are interfaced to a first comparator 160. Similarly, a destination window identifier 170 and a destination pixel identifier 180 which comprise destination register 100 are interfaced to a second comparator 190. The output of each of the comparators 160 and 190 are input to a logic block 200 which in preferred embodiments is an AND gate. For AND gate 200 to give a logical "on" result 210, both paths from comparators 160 and 190 must be true. Result 210 is bussed to the frame buffer control and represents clipped window data which determines which pixel color values be Will be stored in frame buffer 40.

In operation of the circuit of FIG. 2 during rendering operations, only the destination comparator 190 is used, and the source comparator 160 is completely disabled by loading the mask register 130 with the hexadecimal word "FF." During rendering, bits that will be compared in destination comparator 190 are cleared and the remaining bits are set in mask register 130. The window identifier of the window which will be written to frame buffer 40 is then loaded into the destination register 100. During rendering, the destination tile is read into the destination register 100, and as each pixel is processed in the pixel cache, the appropriate byte is routed to the destination comparator 190 where it is masked and compared. If the window identifier stored in destination register 100 matches the window identifier stored in the identifier register 120, then the AND gate 200 is true and the result 210 signifies that the pixel data can be written back to the frame buffer. Otherwise, the result 210 indicates that this particular pixel data is not to be written back to the frame buffer.

For block moves in accordance with the present invention, both the source comparator 160 and the destination comparator 190 are used to allow clipping on both source area 60 and destination area 70. In this situation, two masks in mask register 130 and particular window identifiers stored in the destination register 100 and source register 110 are set up to allow clipping for different windows. A destination tile is preferably read from the frame buffer and the window identifier stored in the destination register 110 for preferably four pixels on a scan line are sent serially through comparators 160 and 190. Both the source and destination identifiers stored in the source register 110 and destination register 100 respectively must match the window identifier bits written to the identifier register 120 from host processor 10 for the particular pixel to be written back to the frame buffer, that is, for a result 210 to be true from AND gate 200. In still further preferred embodiments, either source comparator 160 or destination comparator 190 can be disabled by writing the hexadecimal number "FF" into the mask register 130. This allows clipping on read cycles, write cycles, on both cycles, or on neither cycle.

In operation of the circuit of FIG. 2, pixel window identities on the frame buffer 40 are compared with values stored in pixel cache 80 in the destination register 100 and the source register 110. If the two values are identical, the new pixel data being rendered to frame buffer 40 belongs to the same window as the pixel being compared against. This means that the new pixel data can replace the old pixel data. If the identifiers do not match, the new pixel data is discarded and the data in the frame buffer for that pixel does not change.

During block moves, a source pixel on source area 60 is also read. Along with the source pixel comes the particular window identifier bit. The source window identifier bit is compared with a value stored in the pixel cache in the identifier register 120. If both the source window identifier bit and the destination window identifier bit match the pixel, the pixel can be written back to the frame buffer 40, otherwise it is discarded.

Figure 3A:
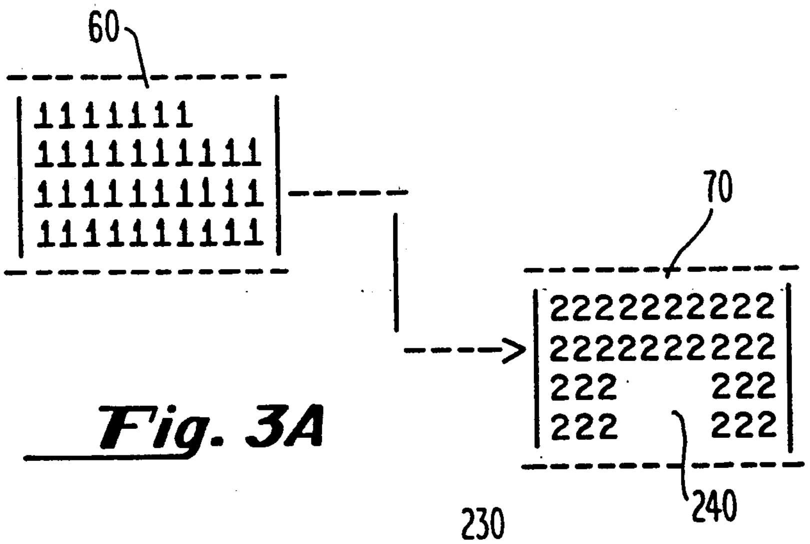
FIGS. 3A and 3B are an illustration of pixel data moved from a source window to a destination window in accordance with the present invention.

In preferred embodiments, block moves only occur on rectangular areas in the frame buffer. However, windows can take any shape desired on the frame buffer 40. Preferably in order to simplify the window moving process, a rectangular block may be set up which will encompass the window that is desired to be moved. The hardware will move the appropriate pixels in the window. Referring to FIG. 3, such rectangular blocks are illustrated. The source window is shown at 60 and has pixel values denoted as "one's." A destination window is shown at 70 and has destination pixels and identifiers denoted as "two's." All other pixels on display monitor 50 will have another number not shown in this example. It is desired to move pixels denoted as "one's" in source area 60 to the window 70 which is not rectangular but has pixel values and identifiers denoted as "two's."

Figure 3B:
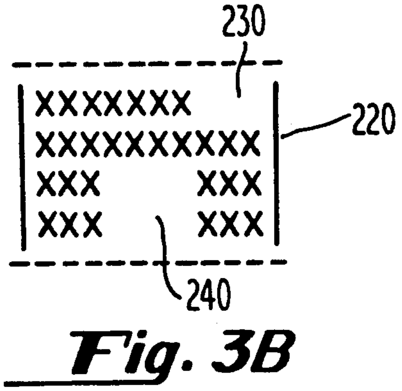

Referring now to FIG. 3B, the resultant window is shown at 220. Resulting pixels that are moved from source 60 to destination 70 are denoted as "X's" on the destination window 220. It can be seen that since there were no "one's" in the upper right hand corner at 230, no X's appear in these locations. Since the destination on the frame buffer does not exist in area 240, the "one's" that existed in the source area corresponding to these pixel locations do not appear as X's on the destination window 220. Thus, the destination window is said to be "clipped."

Block moves and window clipping provided in accordance with the present invention solve a long-felt need in the art for fast and efficient window clipping and block moves that are accomplished in hardware. This eliminates the need for slower software processing of windows and is an economical solution to complex windowing in graphics frame buffer systems. These advantages have not been realized by prior graphics frame buffer systems.

There have thus been described certain preferred embodiments of methods and apparatus for pixel clipping source and destination windows in graphics systems. While preferred embodiments have been described and disclosed, it will be recognized by those with skill in the art that modifications are within the true spirit and scope of the invention. The appended claims are intended to cover all such modifications.

What is claimed is:

1. A method of moving blocks of pixel data from a source area to a destination area within a frame buffer in a computer graphics system, said pixel data including a window identifier and a pixel identifier for each pixel, the method comprising the steps of:

reading a block of pixel data from said source area into a memory according to a plurality of source tiles;

comparing pixel window identifiers read from the frame buffer with a pixel window identifier previously stored in the memory to determine whether the pixel window identifiers read from the frame buffer match the pixel window identifier previously stored in the memory;

discarding each pixel whose corresponding window identifier does not match the previously stored window identifier with which the corresponding window identifier was compared; and updating the frame buffer with the pixel data not discarded, wherein the respective window identifiers each comprise a data indicative of one of a plurality of visible windows associated with said graphics system.

2. The method recited in claim 1 further comprising the steps of:

setting a mask with a plurality of bits; and combining the mask with the destination tiles so that the pixel window identifiers on the frame buffer and the previously stored pixel window identifier on the memory are matched.

3. The method recited in claim 2 wherein the memory is a pixel cache.

4. The method recited in claim 3 wherein the pixel data comprises information relating to colors for a graphics primitive and information relating to a window on a display device where the pixel is activated.

5. The method recited in claim 4 wherein there are eight source tiles read into the pixel cache from the frame buffer.

6. The method recited in claim 5 wherein there are up to eight destination tiles read into the pixel cache from the frame buffer.

7. The method recited in claim 6 further comprising the step of displaying the block of pixel data on the display device.

8. The method recited in claim 7 wherein the display device is a raster scan display device.

9. The method recited in claim 8 wherein the raster scan display device comprises a plurality of pixels.

10. A method of moving blocks of pixel data corresponding to graphics primitives between windows in a graphics frame buffer system comprising the steps of:

addressing a source window on the frame buffer with a source window register having a source window identifier and a source pixel identifier, the source window identifier comprising data indicative of one of a plurality of visible windows associated with said graphics system;

addressing a destination window on the frame buffer with a destination window register having a destination window identifier and a destination pixel identifier, the destination window identifier comprising data indicative of one of said visible windows associated with said graphics system;

comparing the source window identifier with a previously stored source window identifier and the destination window identifier with a previously stored destination window identifier;

discarding the destination pixels if the source comparison of destination comparison indicates that the source window identifier or destination window identifier does not match the previously stored identifier with which that source or destination window identifier was compared; and rendering to the frame buffer remaining source pixels on a destination window.

11. The method recited in claim 10 further comprising the steps of:

addressing a mask register with a plurality of mask bits; and combining the mask register with the destination window register so that a number of clipping planes used in the comparison step is defined.

12. The method recited in claim 11 further comprising the step of storing the source window in a memory.

13. The method recited in claim 12 wherein the source window comprises up to eight tiles and the destination window comprises up to eight tiles.

14. The method recited in claim 13 further comprising the step of combining the destination window tiles and the source window tiles stored in the memory a single pixel at a time.

15. The method recited in claim 14 wherein the memory is a pixel cache.

16. The method recited in claim 14 further comprising the step of displaying the destination window on a display device.

17. The method recited in claim 16 wherein the displaying step comprises the steps of:

scanning the frame buffer; and outputting pixel value data on the display device.

18. The method recited in claim 17 wherein the display device is a raster scan cathode ray tube.

19. A system for moving data blocks from a source window to a destination window in a graphics system comprising:

memory means for storing source window data and destination window data, the respective source and destination window data each being indicative of one of a plurality of visible windows associated with said graphics system;

source window register means interfaced with the memory means for storing pixel value data and data indicating a pixel's location within the source window;

first comparator means interfaced with the source window register means for comparing the pixel value data with a source window identifier;

destination window register means interfaced with the memory means for storing the pixel value data within the destination window;

second comparator means interfaced with the destination window register means for comparing the pixel value data with a destination window identifier; and combining means interfaced with the first and second comparator means for determining whether source pixel can be moved to the destination window.

20. The system recited in claim 19 further comprising frame buffer means interfaced with the memory means for rendering pixel value data corresponding to the graphics primitives.

21. The system recited in claim 20 further comprising display means interfaced with the frame buffer means for displaying the pixel value data corresponding to graphics primitives.

22. The system recited in claim 21 wherein the display means is a raster scan cathode ray tube.

23. The system recited in claim 22 further comprising mask register means interfaced with the destination window register means for masking the destination register means.

24. The system recited in claim 23 further comprising mask register means interfaced with the source window register means for masking the source register means.

25. The system recited in claim 24 wherein the memory means is a pixel cache buffer.

26. The system recited in claim 25 wherein the source register means and destination register means are adapted to store at least eight tiles of pixel value data.

27. A computer graphics system, comprising:

(a) a frame buffer, having a source area and a destination area, for storing pixel data, said pixel data including a window identifier and a pixel identifier for each pixel, said window identifiers each comprising data indicative of one of a plurality of visible windows associated with said graphics system;

(b) a window cache, coupled to said frame buffer, comprising first and second memory areas;

(c) means for reading a block of pixel data from said source area into said first memory area according to a plurality of source tiles;

(d) means for reading a block of pixel data from said destination area into said second memory area according to a plurality of destination tiles;

(e) means for comparing pixel window identifiers read from the frame buffer with a pixel window identifier previously stored in the memory to determine whether the pixel window identifiers read from the frame buffer match the pixel window identifier previously stored in the memory;

(f) means for discarding each pixel whose corresponding window identifier does not match the previously stored window identifier with which the corresponding window identifier was compared; and (g) means for updating the frame buffer with the pixel data not discarded.

28. A system for moving source pixel data from a source window to a destination window in a graphics system, the destination window containing destination pixel data, the system comprising:

memory means for storing source window data and destination window data;

source window register means interfaced with the memory means for storing a source window identifier comprising data indicative of one of a plurality of visible windows associated with said graphics system;

first comparator means interfaced with the source window register means for comparing source pixel data with the source window identifier;

destination window register means interfaced with the memory means for storing a destination window identifier comprising data indicative of one of said visible windows;

second comparator means interfaced with the destination window register means for comparing destination pixel data with the destination window identifier; and combining means interfaced with the first and second comparator means for determining whether source pixels can be moved to the destination window.

* * * * *

UNITED STATES PATENT AND TRADEMARK OFFICE

CERTIFICATE OF CORRECTION

PATENT NO. : 5,193,148

DATED : 3/9/93

INVENTOR(S) : Byron A Alcorn, Robert W. Cherry, Mark D. Coleman, Brian D. Rauchfuss It is certified that error appears in the above-identified patent and that said Letters Patent is hereby corrected as shown below:

Col. 8, line 37 - "a data" to --data--

Col. 9, line 18 - "of destination" to --or destination--

Col. 10,line 10 - "pixel" to --pixels"

Signed and Sealed this

Twenty-ninth Day of March, 1994

Attest:

BRUCE LEHMAN

Attesting Officer

Commissioner of Patents and Trademarks